(12) United States Patent
LeGrand, III et al.

(10) Patent No.: US 9,598,169 B1
(45) Date of Patent: *Mar. 21, 2017

(54) SINGLE BLADE ROTOR SYSTEM FOR USE IN A VERTICAL TAKEOFF AND LANDING (VTOL) AIRCRAFT

(71) Applicant: Amazon Technologies, Inc., Seattle, WA (US)

(72) Inventors: Louis LeRoi LeGrand, III, Seattle, WA (US); Ricky Dean Welsh, Bellevue, WA (US); Walker Chamberlain Robb, Seattle, WA (US); Robert Roy Champagne, Jr., Kirkland, WA (US); Daniel Buchmueller, Seattle, WA (US); Joshua White Traube, Seattle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,845

(22) Filed: Apr. 8, 2016

Related U.S. Application Data

(63) Continuation of application No. 14/559,529, filed on Dec. 3, 2014, now Pat. No. 9,334,049.

(51) Int. Cl.
*B64C 27/30* (2006.01)
*B64C 27/24* (2006.01)
*B64C 13/00* (2006.01)
*B64C 29/00* (2006.01)
*B64D 27/24* (2006.01)
*B64C 27/473* (2006.01)

(52) U.S. Cl.
CPC .............. *B64C 27/30* (2013.01); *B64C 13/00* (2013.01); *B64C 27/473* (2013.01); *B64C 29/0025* (2013.01); *B64D 27/24* (2013.01)

(58) Field of Classification Search
CPC ......... B64C 27/22; B64C 27/24; B64C 27/26; B64C 27/30; B64C 27/473; B64C 29/0025; G05D 1/00; G05D 1/08
See application file for complete search history.

(56) References Cited

U.S. PATENT DOCUMENTS 2,837,301 A * 6/1958 Jenney ................ B64C 29/0025
244/7 R
3,074,487 A 1/1963 Derschmidt
(Continued)

*Primary Examiner* — Tien Dinh
*Assistant Examiner* — Richard R Green
(74) *Attorney, Agent, or Firm* — Lee & Hayes, PLLC

(57) ABSTRACT

This disclosure is directed to a single blade propeller and systems, devices, and techniques pertaining to assisting in critical stages of flight (e.g., takeoff, landing, emergency situations, etc.) in vertical takeoff and landing (VTOL) aircraft. The single blade propeller may be incorporated into fixed and rotary wing VTOL aircraft as part of a first propulsion system. The first propulsion system may include one or more single blade propellers driven by electric motors, combustion engines, and/or hybrid engines. Each of the single blade propellers may include a lift-producing blade and a counterweight opposite the lift-producing blade. As each of the single blade propellers spins, it may produce lift in a direction approximately perpendicular to the horizon to effect vertical flight.

20 Claims, 7 Drawing Sheets

(56) References Cited

U.S. PATENT DOCUMENTS

| | | | |
|---|---|---|---|
| 3,693,910 A | 9/1972 | Aldi | |
| 6,234,422 B1 | 5/2001 | Bolonkin | |
| 6,293,491 B1 * | 9/2001 | Wobben | B64C 27/00 244/17.23 |
| 7,159,817 B2 * | 1/2007 | VanderMey | B64C 29/0016 244/12.1 |
| 8,219,267 B2 * | 7/2012 | Hamke | G01P 7/00 701/14 |
| 8,235,660 B2 * | 8/2012 | Hort | F04D 25/088 416/144 |
| 9,334,049 B1 * | 5/2016 | LeGrand, III | B64C 29/0025 |

* cited by examiner

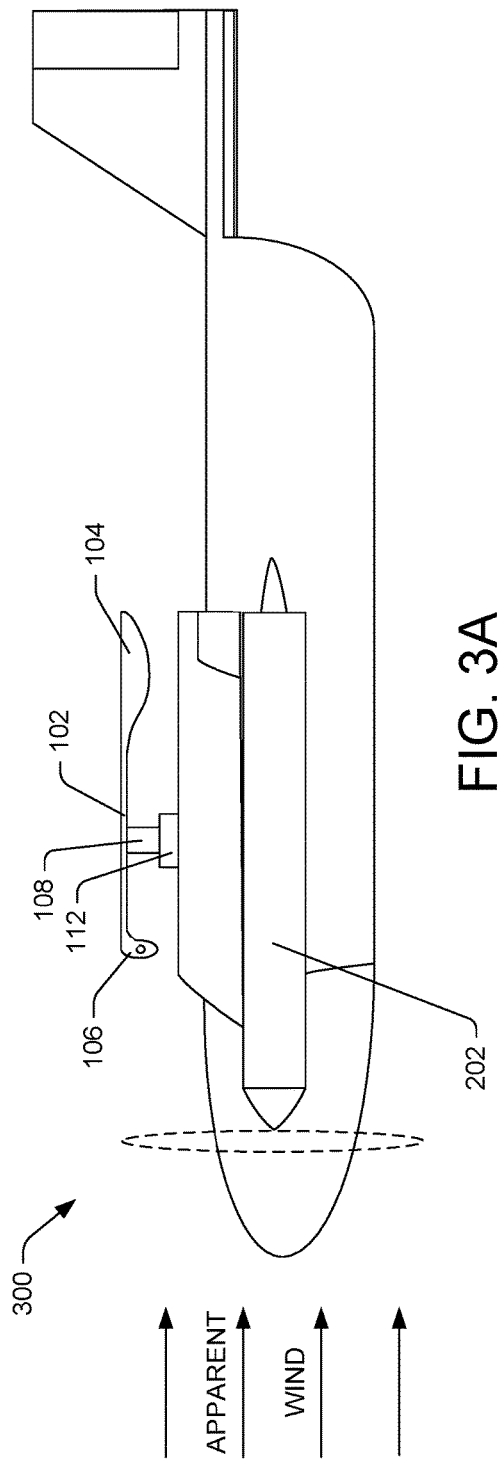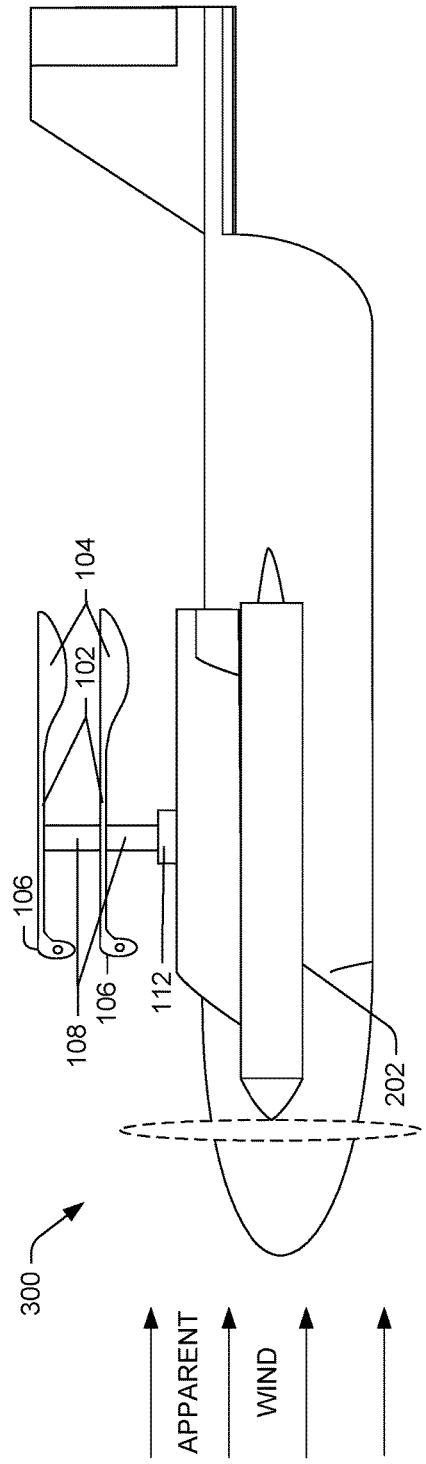

US 9,598,169 B1

SINGLE BLADE ROTOR SYSTEM FOR USE IN A VERTICAL TAKEOFF AND LANDING (VTOL) AIRCRAFT

RELATED APPLICATIONS

This application claims priority to and is a continuation of U.S. patent application Ser. No. 14/559,529, filed on Dec. 3, 2014, the entire contents of which are incorporated herein by reference.

BACKGROUND

Aircraft capable of vertical takeoff and landing (VTOL) are well known in aviation. Both manned and unmanned versions of VTOL aircraft fly every day around the world. VTOL aircraft are flown in all facets of aviation, from small hobby aircraft to large personnel carriers. However, traditional VTOL aircraft are extremely complex and have many moving parts, making them dangerous for the general public.

Typically, the most dangerous phases of flight are takeoff and landing. During these phases, VTOL aircraft may be considered more dangerous than traditional aircraft. For example, fixed wing VTOL aircraft must incorporate many moving parts into the propulsion system to adjust the thrust from a direction approximately parallel to the horizon for forward flight, and one that is approximately perpendicular to the horizon for hover and landing. The multitude of moving parts during the transition, as well as close proximity to the ground, make the takeoff and landing phases exceedingly dangerous.

Rotary VTOL aircraft, such as helicopters, quadcopters, and other rotorcraft, may also be considered more dangerous than traditional fixed wing aircraft during takeoff and landing. Though rotary wing aircraft primarily rely on a propulsion system in a fixed orientation providing upward lift, there are still many moving parts in the propulsion system which make these phases of flight dangerous. For example, helicopters, because of the direction of landing, are subject to dangers, such as loss of control due in part to the speed of descent (e.g., settling with power).

Though VTOL aircraft may be more dangerous, they offer unique advantages and considerations as compared to their traditional fixed wing counterpart. For example, VTOL aircraft may take off vertically, without the use of a runway, and may reach speeds equivalent to their fixed wing counterparts. Due to the many advantages of VTOL aircraft, they will continue to be increasingly more popular in aviation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1A depicts the single blade propeller spinning in a vertical flight configuration, and FIG. 1B depicts the single blade propeller weathervaned in a horizontal flight configuration.

FIGS. 3A and 3B are side views of an illustrative fixed wing aircraft with one or more single blade propeller(s) as a vertical propulsion system. FIG. 3A depicts an electrically driven horizontal propulsion system. FIG. 3B depicts an electrically driven vertical propulsion system with two single blade propellers and a combustion engine driven horizontal propulsion system.

DETAILED DESCRIPTION

Figure 1A:
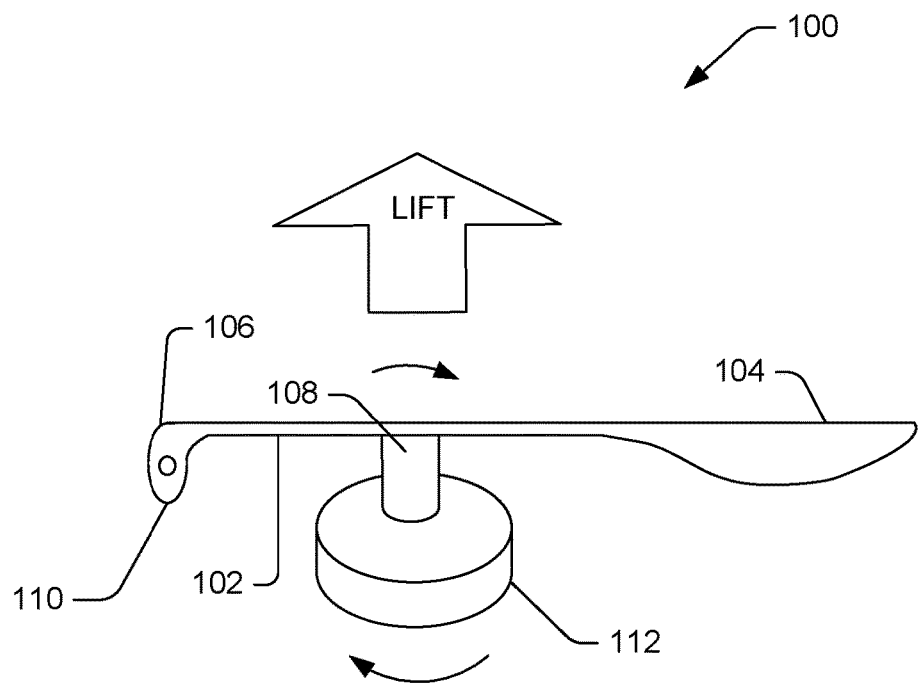
FIGS. 1A and 1B are perspective views of an illustrative single blade propeller depicted as it would be mounted on a vertical takeoff and landing (VTOL) aircraft.

This disclosure is directed to, in part, single blade propellers and systems, devices, and techniques pertaining to assisting in critical stages of flight (e.g., takeoff, landing, emergency situations, etc.) in vertical takeoff and landing (VTOL) aircraft. The single blade propeller may be incorporated into fixed and rotary wing VTOL aircraft as part of a first propulsion system. The first propulsion system may include one or more single blade propellers driven by electric motors, combustion engines, and/or hybrid engines. Each of the single blade propellers may include an aerodynamic blade and a counterweight opposing the aerodynamic blade. As each of the single blade propellers spins, it may produce lift in a direction approximately perpendicular to the horizon to effect vertical flight.

In some embodiments, the single blade propellers are mounted on fixed wing VTOL aircraft. In such embodiments, the single blade propellers may provide most of the vertical lift capability for the VTOL aircraft. The fixed wing VTOL aircraft with single blade propellers may also include a second propulsion system configured to produce thrust substantially parallel to the horizon. In other embodiments, the VTOL aircraft may be a rotary (i.e., non-fixed) wing design, and may include a second propulsion system configured to produce thrust substantially perpendicular to the horizon, such that the single blade propellers augment the vertical lift capability.

Regardless of the aircraft configuration, fixed or rotary wing, the single blade propellers may provide vertical lift capability, thereby enhancing the safety in critical stages of flight. The vertical lift provided by the spinning single blade propellers may cause the aircraft to lift into a hover. The VTOL aircraft may transition to forward flight by engaging the second propulsion system. During the transition, the single blade propellers may continue to provide vertical lift, thereby increasing the distance of the aircraft from the ground. Once established in forward flight, the first propulsion system driving the single blade propellers may be disengaged. Upon disengaging the first propulsion system, the single blade propellers may stop spinning, and "weathervane," or self-align, such that the aerodynamic blade is oriented opposite the direction of travel.

At any time during forward flight, the aircraft may re-engage the single blade propellers of the first propulsion system in order to provide vertical lift. For example, the aircraft may re-engage the first propulsion system to effect a transition to landing, to assist in a climb, to provide redundancy in a descent, to provide backup lift in the case of an emergency, or in any other situation requiring an increased lift capability.

As used herein, the term lift is associated with a vertical aerodynamic force, and thrust is associated with a horizontal force. However, it is understood that lift and thrust are similar forces, but with different vectors (i.e., lift is a vertical thrust).

The apparatuses, techniques, and systems described herein may be implemented in a number of ways. Example implementations are provided below with reference to the following figures.

Figure 1B:
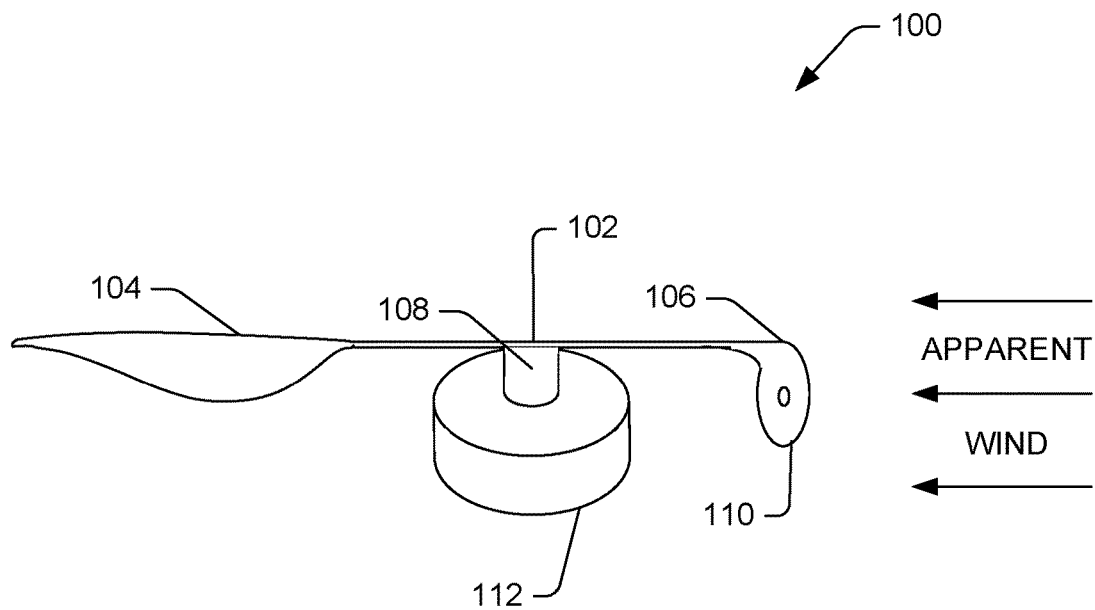

FIGS. 1A and 1B are perspective views of an illustrative single blade propeller system depicted as it would be mounted on a vertical takeoff and landing (VTOL) aircraft. FIG. 1A depicts the single blade propeller system spinning in a vertical flight configuration, and FIG. 1B depicts the single blade propeller system weathervaned in a horizontal flight configuration.

The single blade propeller system 100 may comprise a single blade propeller 102 with an aerodynamic blade 104 configured opposite a counterweight 106. The aerodynamic blade 104 may be made of a composite material (e.g., carbon fiber, fiberglass, etc.), a plastic material (e.g., acrylic, polyethylene, polypropylene, etc.), a wood material, or a combination of the foregoing. The aerodynamic blade 104 may have a positive camber to produce lift in the vertical flight configuration when the aerodynamic blade rotates about a shaft 108. The single blade propeller 102 may be a variable speed and/or variable pitch propeller.

In the illustrative example shown in FIGS. 1A and 1B, the counterweight 106 is configured to have a droop 110. In such embodiments, the droop 110 may hang below a horizontal plane established by the single blade propeller, and may, through centripetal or centrifugal force, balance the lift produced by the aerodynamic blade 104 in the vertical flight configuration, such as that depicted in FIG. 1A. The counterweight 106 and/or the droop 110 may be made of a metal material (e.g., steel, stainless steel, depleted uranium, tungsten, aluminum, titanium, etc.), a composite material, a plastic material, or a combination of the foregoing.

In some embodiments, the counterweight 106 may be configured as a second aerodynamic blade, the second aerodynamic blade being of a shorter wingspan than aerodynamic blade 104. In some embodiments, the second aerodynamic blade may be made of a composite material or a plastic material, and may be at least partially filled with a metal material. In some embodiments, the second aerodynamic blade may be made of a metal material.

In various embodiments, the single blade propeller 102 may be coupled to a motor 112 via shaft 108. The shaft 108 may be made of a metal material, a composite material, or any other reasonable material. In the illustrative example, the shaft 108 is coupled to the single blade propeller 102 at one end, and coupled directly to the motor 112 at the other end. In some embodiments, the single blade propeller 102 may be coupled to the motor 112 indirectly. For example, the shaft 108 may comprise one or more reduction gear boxes between the motor 112 and the single blade propeller 102, thereby reducing the rotational speed of shaft 108. For another example, the shaft 108 may comprise one or more couplings to change direction of the shaft 108. This may be necessary in embodiments with one motor driving more than one single blade propeller 102.

FIGS. 1A and 1B show an example of a single blade propeller 102 coupled to and driven by a motor 112. In various embodiments, motor 112 may be an electric motor. In such embodiments, motor 112 may be powered by one or more batteries. However, other propulsion systems are imagined, such as a full combustion engine (e.g., gas turbine, jet engine, diesel engine, etc.), or a hybrid engine (i.e., an engine used to convert liquid fuel to electrical energy to drive an electric motor and/or a fuel powered generator used to provide electrical power to the electric motors).

In the illustrative example shown in FIG. 1A, motor 112 may drive the rotation of aerodynamic blade 104, thereby creating lift. The lift generated by aerodynamic blade 104 may facilitate the VTOL aircraft in takeoff, a climb, or to slow a rate of descent. In fixed wing VTOL aircraft, the aerodynamic blade 104 may be the primary lift generator for a vertical flight configuration. In a rotary wing VTOL aircraft, the aerodynamic blade 104 may be a secondary lift generator for a vertical flight configuration, thereby providing extra lift for safety considerations during critical stages of flight.

In various embodiments, the VTOL aircraft with a single blade propeller 102 may transition from a vertical flight configuration to a horizontal flight configuration by engaging a second propulsion system to provide thrust in a substantially horizontal direction. During the transition, the vertical lift provided by the rotation of the aerodynamic blade 104 may be unnecessary to maintain altitude. Thus, during the transition, the motor 112 may be disengaged, thereby allowing the single blade propeller 102 to slow its rotation to a stop once the transition is complete.

FIG. 1B depicts the single blade propeller 102 in the horizontal flight configuration at the completion of the transition. In such a configuration, the second propulsion system may establish the aircraft in horizontal flight, thereby producing apparent wind. The single blade propeller 102 may weathervane in the wind, coming to a stop with the aerodynamic blade oriented away from the direction of travel. The single blade propeller 102 may remain in the weathervaned position until motor 112 reengages, and aerodynamic blade 104 begins to rotate again. Reengaging the single blade propeller 102 may be desirable in an emergency, if the aircraft needs assistance in climb, or during a transition back to the vertical flight configuration.

Figure 2:
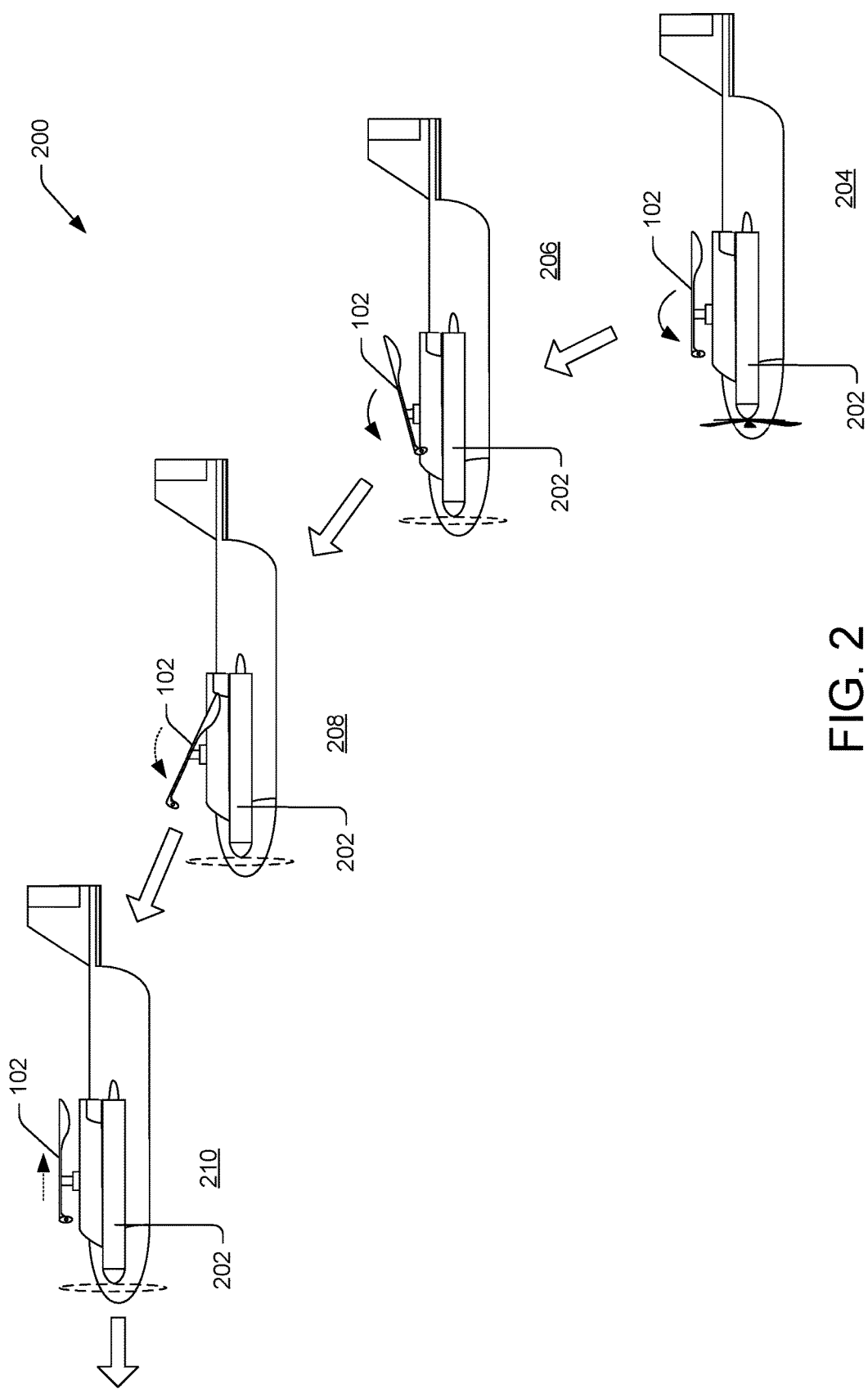
FIG. 2 is a pictorial flow diagram showing an illustrative process of transitioning between a vertical flight configuration and a horizontal flight configuration by a VTOL aircraft.

FIG. 2 is a pictorial flow diagram showing an illustrative process of transitioning between a vertical flight configuration and a horizontal flight configuration by a VTOL aircraft.

The VTOL aircraft depicted in FIG. 2 comprises two propulsion systems. A first (horizontal) propulsion system 202 comprises one or more propellers driven by one or more engines, the propellers producing thrust that is substantially horizontal. In some embodiments, the engines may be electric motors, combustion engines, hybrid engines, or any other reasonable propulsion system.

The second (vertical) propulsion system comprises one or more single blade propeller systems, such as single blade propeller system 100. The single blade propeller systems may comprise an aerodynamic blade and a counterweight opposite the aerodynamic blade. The second propulsion system may be designed to produce a substantial amount vertical lift, thereby enabling the VTOL aircraft to fly in a vertical flight configuration, such as a vertical climb, a vertical descent and/or a hover.

In various embodiments, the VTOL aircraft may include a control management system capable of controlling the first and second propulsion systems. The control management system may comprise a computing system, and one or more accelerometers, gyroscopes, distance sensors (e.g., a range finding laser), and/or cameras. In some embodiments, the control management system may receive inputs directly from an operator in the aircraft. In some embodiments, the control management system may receive inputs from a remotely located operator via a wired and/or a wireless signal. In some embodiments, the control management system may be configured to fly a pre-programmed flight plan without real-time inputs from an operator.

At position 204, the one or more single blade propellers 102 are driven by one or more motors, such as motor 110, thereby producing vertical lift. In the illustrative example, the single blade propellers 102 may be the sole vertical lift generating surface used to establish the aircraft in a vertical flight configuration. However, in some embodiments, such as rotary wing designs, the single blade propellers 102 may augment the vertical lift generated from the second propulsion systems. The augmentation of vertical lift in such embodiments may have substantial benefits, such as allowing for an increase in payload of the VTOL aircraft, increasing safety during critical stages of flight, etc.

At or before position 204, the first propulsion system 202 may not be engaged. In some embodiments, the first propulsion system 202 may be engaged at an idle position. In embodiments in which the first propulsion systems comprises propeller driven thrust, the idle position is where the propellers are substantially feathered. In a feathered position, the propellers produce little to no thrust. In embodiments in which the second propulsion systems comprise engine driven thrust, the engines may be engaged at an idle position in which the engines produce little to no thrust.

At position 206, the first propulsion system 202 may begin producing horizontal thrust, causing the VTOL aircraft to move forward. At position 206, the second propulsion (e.g., single blade propellers 102) system may still be engaged and producing vertical lift, thereby enabling the VTOL aircraft to gain altitude while beginning the transition to forward flight.

At position 208, the second propulsion system may be disengaged. When disengaged, the motors driving the single blade propellers 102, may be turned off. Due to rotational inertia, the single blade propellers 102 may still continue to rotate at an increasingly slower rate. As the rate of rotation of the single blade propellers 102 decreases, the vertical lift produced by the single blade propellers 102 decreases. At a certain combination between the rate of rotation of the single blade propellers 102 and the speed of the apparent wind, the single blade propellers 102 may weathervane such that the aerodynamic blade is oriented opposite the direction of the apparent wind.

At position 210, the transition of the VTOL aircraft from the vertical to the horizontal flight configuration is complete. In the horizontal flight configuration, the first propulsion system is the primary propulsion system producing thrust for flight. As depicted, the second propulsion system has been fully disengaged, and the single blade propellers 102 are weathervaned, with the aerodynamic blades oriented opposite the direction of travel. However, if necessary, the second propulsion system may be re-engaged in the horizontal flight configuration if necessary to assist in a climb, or in an emergency situation.

FIGS. 3A and 3B are side views of an illustrative fixed wing aircraft with one or more single blade propellers as the vertical propulsion system. FIG. 3A depicts an electric motor driven vertical propulsion system with one single blade propeller and an electrically driven horizontal propulsion system. FIG. 3B depicts an electrically driven vertical propulsion system with two single blade propellers and an electrically driven horizontal propulsion system.

VTOL aircraft 300 may be a fixed wing aircraft with at least one vertical propulsion system, such as propulsion system 100, and at least one horizontal propulsion system, such as propulsion system 202. In the illustrative example shown in FIG. 3A, the vertical propulsion system comprises a single blade propeller 102, a motor 112, and a shaft 108 to transfer energy between the motor 112 and the single blade propeller 102.

The single blade propellers 102 may be fixed or variable pitch propellers. Variable pitch propellers enable adjustment of the pitch of the propeller blade to increase or decrease an amount of air moved by the propeller blade (and thus the resultant lift) during a rotation of the propeller. The variable pitch may also be configured to allow transition between a positive pitch and a negative pitch, which may reverse a direction of resultant thrust caused by rotation of the propeller.

As shown on VTOL aircraft 300, the single blade propellers may comprise an aerodynamic blade 104 and a counterweight 106 opposite the aerodynamic blade 104. The aerodynamic blade 104 may generate vertical lift when it rotates about the shaft 108, thereby enabling a vertical flight configuration. The counterweight 106 may be a counterbalance to cancel the moment generated by the aerodynamic blade 104. The counterweight 106 may be made of a metal material, a composite material, a plastic material, or a combination of the foregoing.

In the illustrative example, the counterweight is be configured with a droop, such that the center of mass of the counterweight lies below a horizontal plane of the single blade propeller 102. In various implementations, the counterweight may comprise an aerodynamic design to reduce drag when it rotates about the shaft 108 and/or when the single blade propeller 102 is weathervaned.

The vertical propulsion system depicted in FIGS. 3A and 3B may comprise one or more single blade propellers. For example, FIG. 3A depicts a vertical propulsion system with one single blade propeller, whereas FIG. 3B depicts a vertical propulsion system with two stacked single blade propellers. In the illustrative example of FIG. 3B, a bottom single blade propeller 102 rotates counterclockwise and a top single blade propeller 102 rotates clockwise. In some implementations, the top and the bottom single blade propellers 102 may rotate counterclockwise and clockwise, respectively. In some implementations, the top and the bottom single blade propellers 102 may rotate the same way, such as both rotating clockwise.

The single blade propeller 102 may be coupled to and driven by motor 112 via shaft 108. In the illustrative example shown in FIG. 3A, the motor 112 is an electric motor. In such embodiments, the electrical motor may be powered by at least one battery. In some embodiments the battery may be charged via an alternator, a solar panel array, and/or a wind turbine. In some embodiments, the alternator may be coupled to, and generate power from, the horizontal propulsion system 202.

In some embodiments, such as that depicted in FIG. 3B, the single blade propellers 102 may be coupled to an electrical motor. In some embodiments, the single blade propellers 102 may couple to an internal or external combustion engine (e.g., gas turbine, jet engine, diesel engine, etc.), or a hybrid engine (i.e., an engine used to convert liquid fuel to electrical energy to drive an electric motor and/or a fuel powered generator used to provide electrical power to the electric motors).

In various embodiments, the VTOL aircraft may include a control management system capable of controlling the vertical and/or the horizontal propulsion systems. The control management system may comprise a computing system, and one or more accelerometers, gyroscopes, distance sensors (e.g., a range finding laser), and/or cameras. In some embodiments, the control management system may receive inputs from an operator located in the aircraft or at a remote location, via a wired and/or wireless signal. In some embodiments, the control management system may be configured to receive inputs both from an operator located in the aircraft and a remotely located operator via wired and/or wireless signals. Additionally, the control management system may be configured fly a pre-programmed flight plan without real-time inputs from an operator.

The control management system may be configured to send signals to the horizontal and/or vertical propulsion systems. In various embodiments, the signals may be to engage or disengage one or more motors, increase or decrease power, increase or decrease the pitch and/or speed of one or more propellers, adjust flight control surfaces, and/or any other reasonable flight control signal necessary to safely operate the VTOL aircraft.

In a vertical flight configuration, VTOL aircraft 300 may engage the vertical and/or the horizontal propulsion systems. In the illustrative example, the single blade propellers 102 provide vertical lift, while an engine 202 provides horizontal thrust. In some embodiments, the single blade propellers 102 may augment vertical lift provided by a second propulsion system which is capable of providing both vertical lift and horizontal thrust.

FIG. 3A shows a horizontal propulsion system 202 comprising an electrically driven engine coupled to a propeller. In such examples, the propeller of the horizontal propulsion system may be a fixed or variable speed and a fixed or variable pitch propeller. FIG. 3B shows a horizontal propulsion system 202 comprising a jet engine. In some embodiments, horizontal propulsion system 202 may be powered by a combustion engine, or a hybrid engine.

The horizontal propulsion system 202 may produce thrust substantially parallel to the horizon, allowing VTOL aircraft 300 to maintain a horizontal flight configuration. In some embodiments, at least one wing may produce lift during the horizontal flight configuration. In some embodiments, such as rotary wing VTOL aircraft, the horizontal propulsion system may also provide vertical propulsion, thereby generating lift.

FIG. 3A shows VTOL aircraft 300 in the horizontal flight configuration with the horizontal propulsion system 202 engaged, and the vertical propulsion system disengaged. With the vertical propulsion system disengaged, the single blade propeller 102 may weathervane into the apparent wind. When the single blade propeller 102 weathervanes, the counterweight 106 may be oriented in the direction of travel, and the aerodynamic blade 104 may be oriented opposite the direction of travel. In various embodiments, the single blade propeller may generate at least some lift in the weathervaned position.

In some embodiments, the counterweight 106 may be designed with an aerodynamic leading edge, thereby reducing drag while in the horizontal flight regime. In some embodiments, counterweight 106 may be designed to generate at least some lift while in the weathervaned position and/or when rotating. For example, the counterweight 106 may be in the shape of an aerodynamic blade with a smaller than aerodynamic blade 104.

Similarly, FIG. 3B also shows VTOL aircraft 300 in the horizontal flight regime. With the vertical propulsion system disengaged, the both single blade propellers 102 may weathervane into the apparent wind. As with the single blade propeller 102 of FIG. 3A, when the single blade propellers of FIG. 3B 102 weathervane, the counterweights 106 may be oriented in the direction of travel, and the aerodynamic blades 104 may be oriented opposite the direction of travel.

Figure 4:
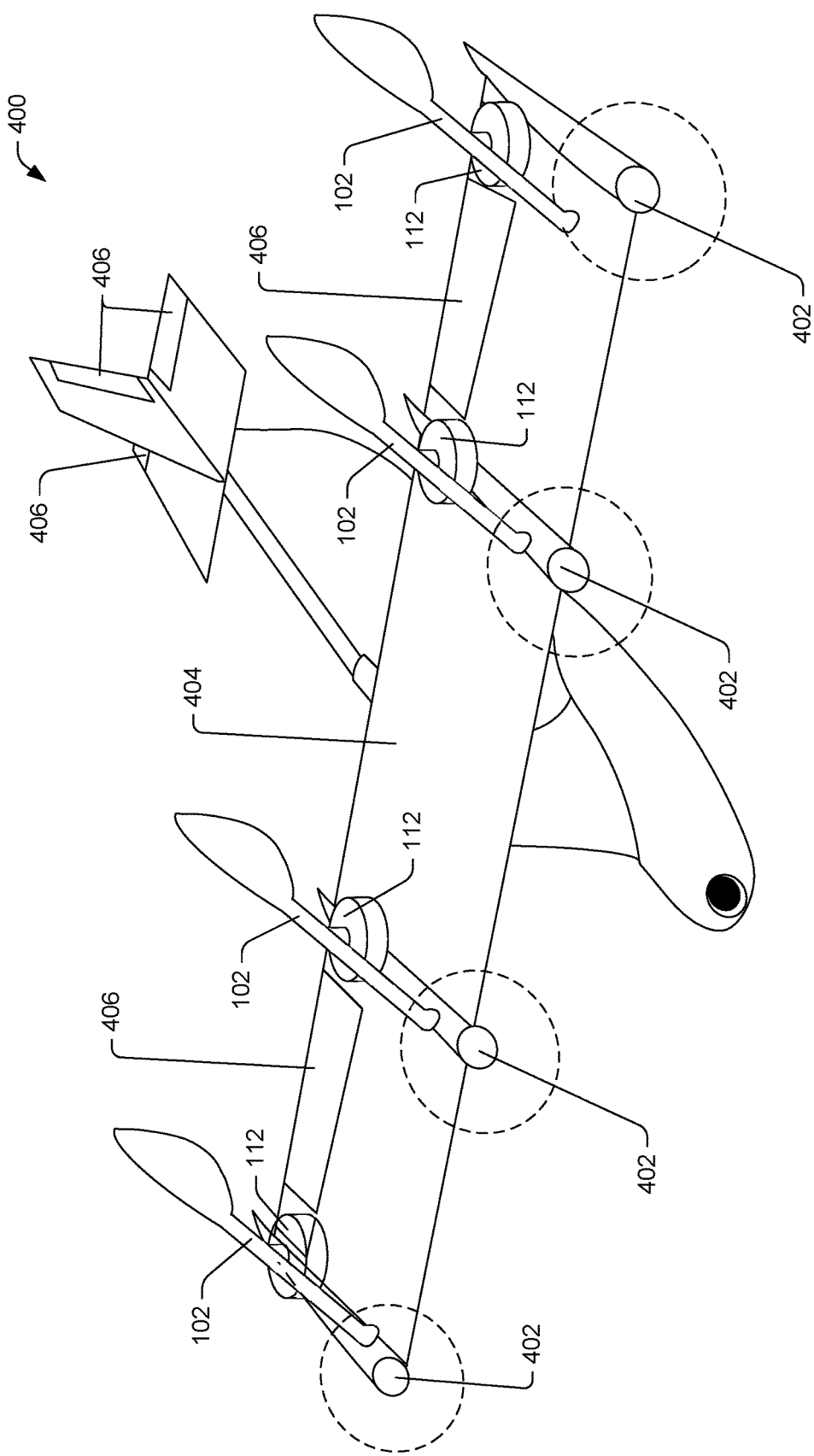
FIG. 4 is an isometric view of a fixed wing aircraft with multiple single blade propellers generating vertical lift, and multiple pushing motors generating horizontal thrust.

FIG. 4 is an isometric view of a fixed wing aircraft with multiple single blade propellers generating vertical lift, and multiple engines generating horizontal thrust.

The VTOL aircraft in FIG. 4 is depicted with four engines 402 and propellers generating horizontal thrust, and four single blade propellers 102, each driven by a motor 112. In the illustrative example, the motors 112 are mounted on a wing 404. In some embodiments, the motors 112 may be mounted inside the wing and/or in a fuselage.

In the illustrative embodiment, each motor 112 drives one single blade propeller 102. However, in some embodiments, one motor 112 may drive more than one single blade propeller 102.

VTOL aircraft 400 may comprise flight control surfaces 406 to assist in the control of the aircraft while transitioning between the vertical and horizontal flight configurations, and when established in the horizontal flight configuration. The flight control surfaces 406 may include one or more ailerons, flaps, elevons, elevators, and/or rudders.

Figure 5:
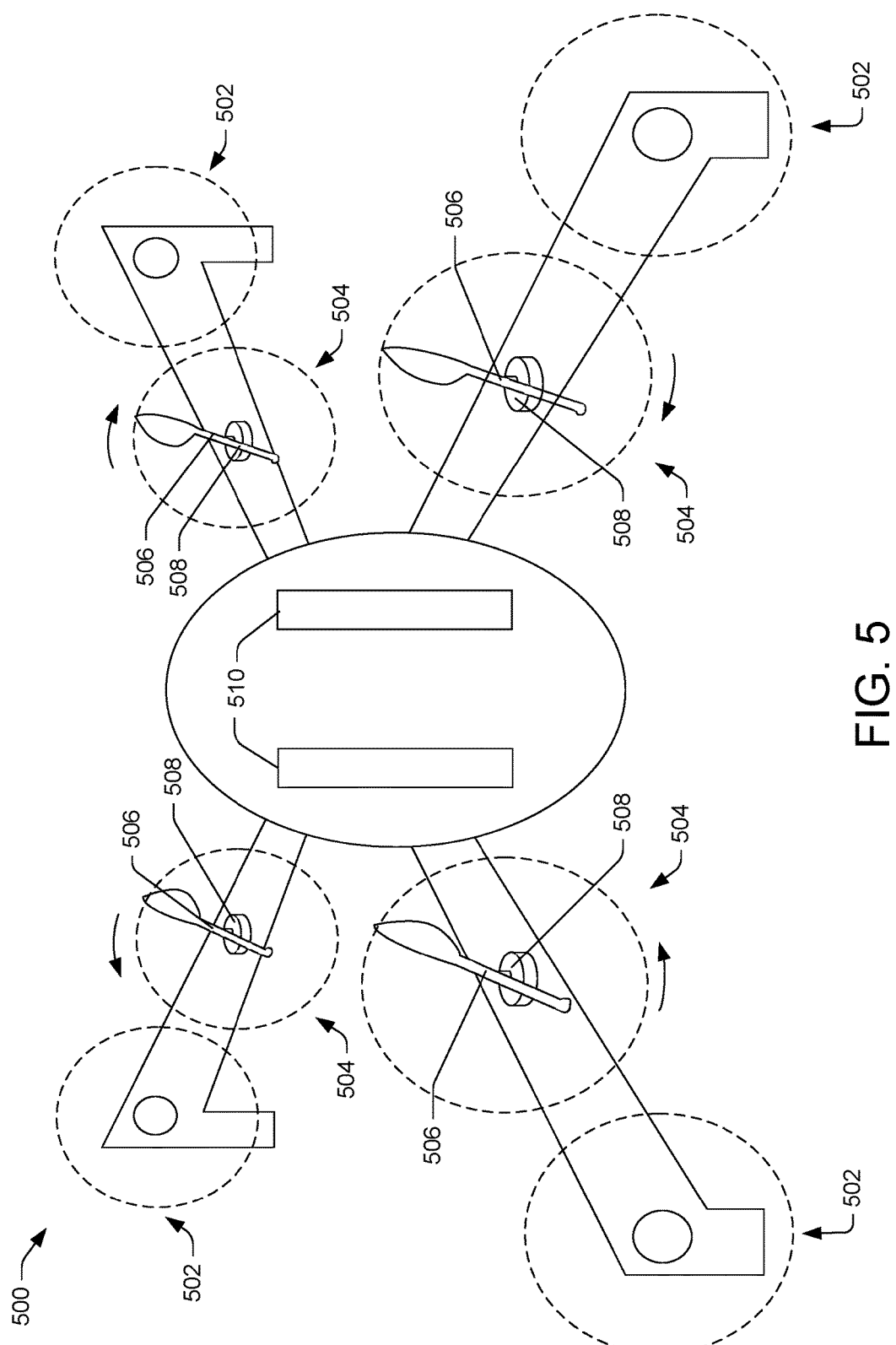
FIG. 5 is an isometric schematic view of a rotary wing aircraft with four standard rotor systems and four single blade propellers to assist in critical stages of flight.

FIG. 5 is an isometric schematic view of a rotary wing aircraft with four standard rotor systems and four single blade propellers to assist in critical stages of flight.

VTOL aircraft 500 is a rotary wing aircraft with a primary propulsion system 502 and a secondary propulsion system 504. The primary propulsion system 502 comprises four traditional rotor blade systems driven by four motors. The rotor blade systems may be a variable speed and/or a variable pitch configuration. Each rotor blade system may comprise at least two blades. The primary propulsion system 502 may be configured to generate horizontal thrust and vertical lift.

The secondary propulsion system 504 may be configured to augment the vertical lift generated by the primary propulsion system 502. As shown in FIG. 5, the secondary propulsion system may comprise four single blade propellers 506. Single blade propellers 506 may be mounted on the same plane as the primary propulsion system 502. In other embodiments, the single blade propellers 506 may be mounted on a different plane than the primary propulsion system 502. In some embodiments, the secondary propulsion system may comprise more than four single blade propellers 506. For example, the secondary propulsion system 504 may have stacked single blade propellers 506, such as the single blade propellers 102 depicted in FIG. 3. In such an example, the secondary propulsion system 504 may comprise eight single blade propellers 506. In additional embodiments, the secondary propulsion system 504 may comprise fewer than four single blade propellers 506.

In the illustrative example, each of the single blade propellers 506 is directly coupled to and driven by a motor 508. The motors 508 may be mounted on VTOL aircraft 500. In some embodiments, the motors 508 may be mounted inside the VTOL aircraft 500, for example, inside a wing and/or in a fuselage.

In various embodiments, motors 508 may be powered by electricity. In some embodiments, VTOL aircraft 500 may comprise solar panels 510 to provide electricity to drive motors 508. In such embodiments, the solar panels may be incorporated into the skin of the VTOL aircraft 500 (i.e., glued or painted on), and/or mounted on the aircraft. In some examples, VTOL aircraft 500 may comprise an alternator, a wind turbine, or any other method for generating electricity. The electricity to power motors 508 may be stored in one or more batteries inside VTOL aircraft 500.

Figure 6:
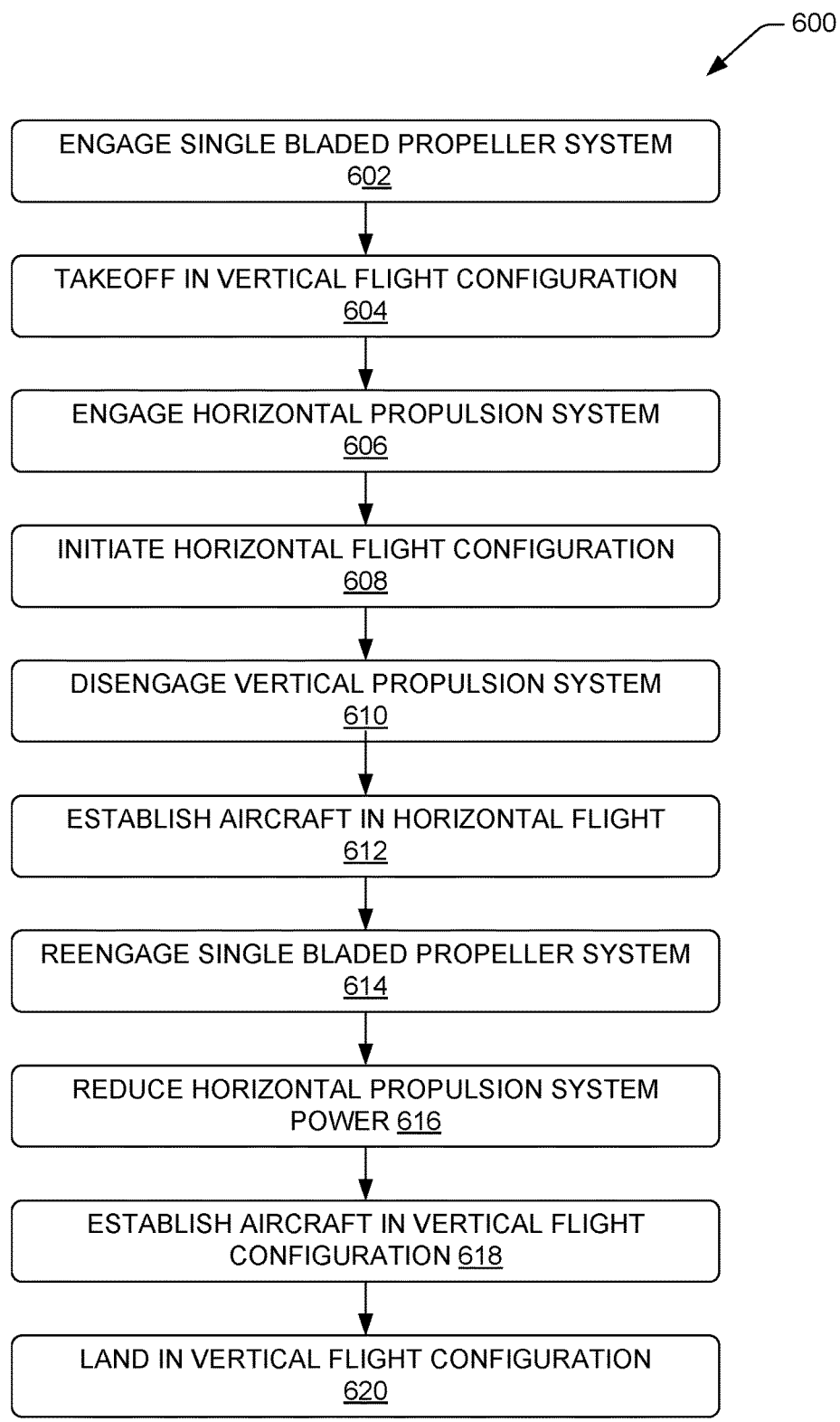
FIG. 6 is a flow diagram showing an illustrative process to transition between a vertical flight configuration and a horizontal flight configuration in a fixed wing VTOL aircraft.

FIG. 6 is a flow diagram showing an illustrative process to transition between a vertical flight configuration and a horizontal flight configuration for a fixed wing VTOL aircraft. The process 600 is illustrated as a collection of blocks in a logical flow graph, which represent a sequence of operations. The order in which the operations are described is not intended to be construed as a limitation, and any number of the described blocks can be combined in any order and/or in parallel to implement the process 600.

At 602 the fixed wing VTOL aircraft may engage a single blade propeller system, such as single blade propeller system 100. The single blade propeller system may be the vertical propulsion system, providing vertical lift when the VTOL aircraft is in a vertical flight configuration.

At 604 the VTOL aircraft may be configured in the vertical flight configuration 204 shown in FIG. 2. In this configuration, the single blade propeller system generates vertical lift, enabling the VTOL aircraft to takeoff vertically. The VTOL aircraft may be capable of hovering.

At 606 the VTOL aircraft may engage the horizontal propulsion system. In various embodiments, the horizontal propulsion system may comprise an engine driven by fuel (gas, solid fuel), electricity, or a chemical reaction. In some embodiments, the horizontal propulsion system may comprise a propeller system with two or more aerodynamic blades. While in the vertical flight configuration, the horizontal propulsion system may be set to an idle position. At the idle position, the horizontal propulsion system may provide little to no thrust. In embodiments with a propeller system, the propellers may be substantially feathered at the idle position.

At 608 the horizontal propulsion system may generate horizontal thrust, thereby driving the VTOL aircraft forward and initiating a horizontal flight configuration.

At 610 the VTOL aircraft may disengage the single blade propeller system. The single blade propeller system may be disengaged by shutting off the motors driving the single blade propellers, such as motor 112. Upon system disengagement, the single blade propellers may rotate at an increasingly slower rate. While the single blade propellers are slowing, the single blade propeller system will produce an increasingly smaller amount of vertical lift.

At 612 the VTOL aircraft may be established in horizontal flight, traveling substantially parallel to the horizon. In horizontal flight, the horizontal propulsion system is the sole propulsion system providing thrust for the VTOL aircraft, while at least one wing or lifting body provides vertical lift.

At 612 the single blade propellers may substantially stop rotation. In the horizontal flight configuration, the single blade propellers may weathervane into the apparent wind. In a weathervaned position, the aerodynamic blade of the single blade propellers may be oriented opposite the direction of travel (i.e., pointed toward an aft end of the VTOL aircraft).

It is known that the apparent wind may change with adjustments in aircraft heading. In various embodiments, the single blade propellers may rotate to a new weathervaned position with each heading change. In some embodiments, the single blade propellers may be locked into a position throughout the 360 degree plane of travel, with a locking mechanism. The locking mechanism may include a pin, a screw, or any other device capable of locking a blade into a position. The locking mechanism may comprise an actuator to move the pin, screw or other locking device between a locked position and an unlocked position.

At 614 the VTOL aircraft may reengage the single blade propeller system, thereby initiating rotation of the single blade propellers. Upon reengagement, the single blade propellers may start again to produce vertical lift. One skilled in the art would understand that if no adjustment is made to the horizontal propulsion system, the VTOL aircraft may begin a climb. If a climb is not desired, the horizontal propulsion system may be throttled back, thereby decreasing the amount of vertical lift generated by the one or more wings of the VTOL aircraft.

At 616 the VTOL aircraft may reduce the power of the horizontal propulsion system. In some implementations, the power may be reduced to an idle power setting. As described above, while in the idle power setting, the horizontal propulsion system may produce little to no horizontal thrust. At 616 the single blade propeller system becomes the sole or majority thrust generating propulsion system of the VTOL aircraft. As such, one skilled in the art would understand that forward motion will slow, and eventually come to a stop.

In some implementations, the power of the horizontal propulsion system may be reduced to a setting above idle, resulting in the aircraft maintaining forward momentum, but at a reduced rate.

At 618 the VTOL aircraft may establish in a vertical flight configuration. In some situations the VTOL aircraft may begin the vertical flight configuration while also continuing forward motion. In such situations, the transition to land may be gradual, such as on a glideslope.

In some situations, the VTOL aircraft may first stop all forward motion and establish in a hover as the start of the vertical flight configuration. The VTOL aircraft may stop forward motion by adjusting the vertical lift vectors produced by the single blade propellers. The VTOL aircraft may adjust the vertical lift vectors by increasing and/or decreasing the speed and/or pitch of the single blade propellers. One skilled in the art would understand that the forward vector may be canceled out by a vector in the opposite direction, of an equal magnitude, such as in a flare.

At 620 the VTOL aircraft may land in the vertical flight configuration. In the vertical flight configuration, the single blade propeller system may provide sufficient vertical lift to control vertical movement. In some implementations, the VTOL aircraft may land with little to no forward motion, such as from a hover.

It is noted, however, that the VTOL aircraft is not limited to a vertical landing. For example, the VTOL aircraft may land with forward motion, such as on a running landing and/or a traditional fixed wing landing. In some implementations, the one or more wings of the VTOL aircraft may provide vertical lift sufficient to control vertical movement. In such implementations, the single blade propeller system may provide a backup vertical lift propulsion system for use in emergency situations. In some implementations, the vertical movement may be controlled by a combination of lift generated by the one or more wings and the single blade propeller system. The combination may be used when more power is required, such as when weather conditions dictate a need (e.g., hot, humid, high altitude, etc.), with a heavy payload, and/or in an emergency.

Figure 7:
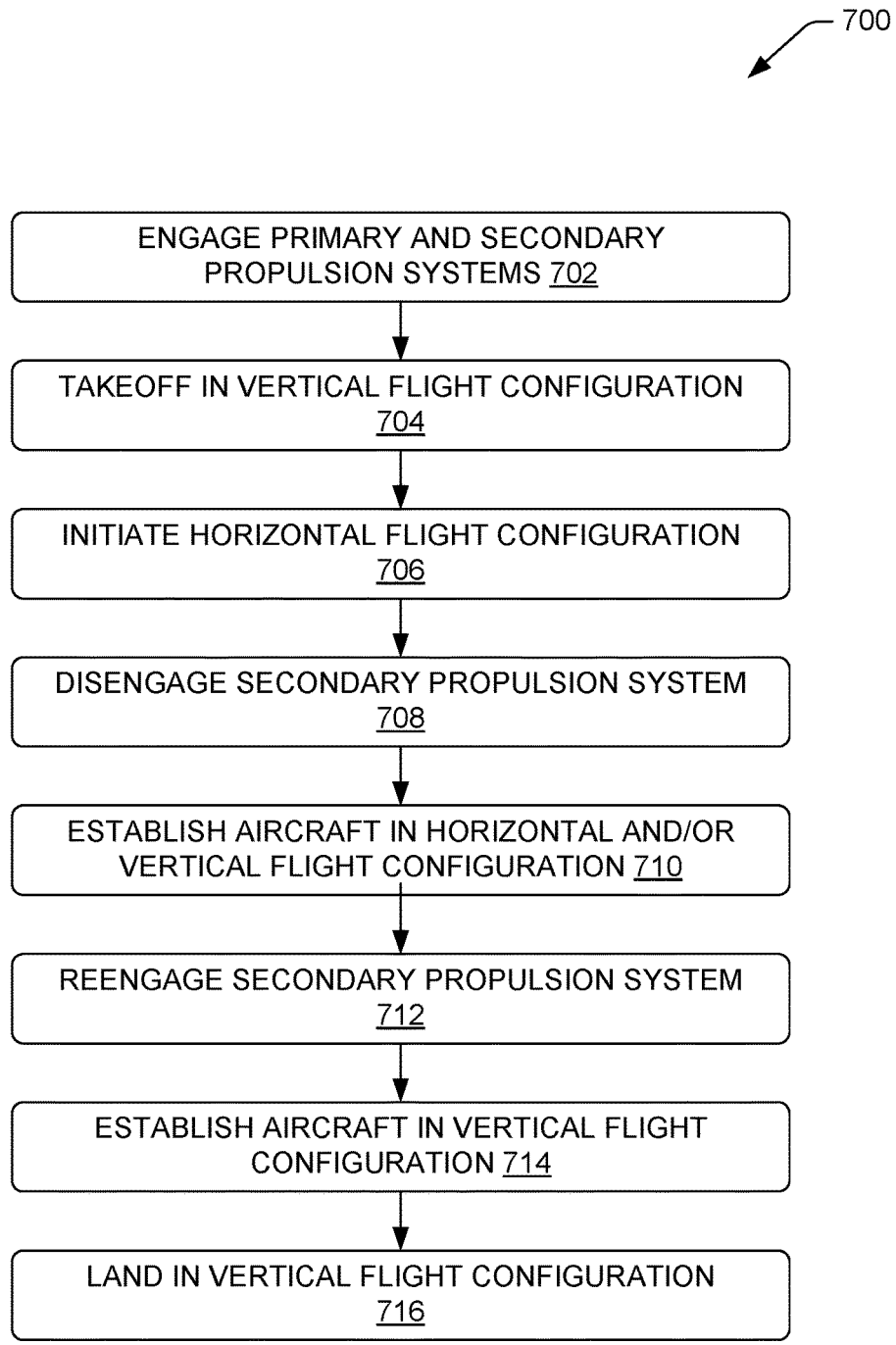
FIG. 7 is a flow diagram showing an illustrative process to transition between a vertical flight configuration and a horizontal flight configuration in a rotary wing VTOL aircraft.

FIG. 7 is a flow diagram showing an illustrative process to transition the vertical takeoff and land aircraft between a vertical flight configuration and a horizontal flight configuration in a rotary wing VTOL aircraft.

At 702 VTOL aircraft engages the primary and secondary propulsion systems. In various embodiments, the primary propulsion system comprises a traditional rotor blade system, such as primary propulsion system 502, comprising two or more aerodynamic blades. The primary propulsion system may be configured to generate horizontal thrust and vertical lift.

The secondary propulsion system may be a single blade propulsion system, such as secondary propulsion system 504. The secondary propulsion system may comprise one or more single blade propellers driven by a motor or an engine. The one or more single blade propellers may comprise an aerodynamic blade and a counterweight. The secondary propulsion system 504 may be configured to augment the vertical lift generated by the primary propulsion system. In some embodiments, the secondary propulsion system may be configured to augment the horizontal lift generated by the primary propulsion system.

At 702 the primary and secondary propulsion systems may be at an idle power setting, producing little to no vertical lift or horizontal thrust.

At 704 the primary and/or secondary propulsion systems may be advanced to a power setting sufficient to takeoff into the vertical flight configuration. The primary propulsion system may generate the vertical lift required to takeoff, with the secondary propulsion system providing a backup for emergency situations, or vice versa. In some embodiments, the primary and the secondary propulsion systems may both generate lift, thereby providing an increased maximum power available setting for the VTOL aircraft.

At 706 the primary propulsion systems may adjust the pitch of the aerodynamic blades of the traditional rotor blade system to generate horizontal thrust, thereby establishing the VTOL aircraft in a horizontal flight configuration.

At 708 the VTOL aircraft may disengage the secondary propulsion system by shutting down the motors driving the single blade propellers. Responsive to secondary propulsion system disengagement, the single blade propellers may rotate at an increasingly slower rate. While the single blade propellers are slowing, the single secondary propulsion system will produce an increasingly smaller amount of vertical lift. The single blade propellers eventually substantially come to rest in a weathervaned position. In the weathervaned position, the aerodynamic blade of the single blade propeller is oriented opposite the direction of travel.

It is known that a rotary wing aircraft is capable of flying in multiple orientations, forward, backward, and to the side. In various embodiments, the single blade propellers may rotate to a new weathervaned position with each change in orientation. In some embodiments, the single blade propellers may be locked into a position throughout the 360 degree plane of travel.

At 710, with the single blade propellers are in the weathervaned position, the primary propulsion system may establish the VTOL aircraft in the horizontal and/or the vertical flight configuration. The primary propulsion system may provide both horizontal and vertical lift capabilities. In some embodiments, vertical lift may be augmented by lift generated by the fuselage and/or one or more wings.

At 712 the VTOL aircraft may reengage the secondary propulsion system by starting the motors coupled to the single blade propellers. Responsive to reengagement of the secondary propulsion system, the single blade propellers may begin to rotate, thereby producing vertical lift. In some embodiments, the lift generated by the secondary propulsion system may augment the primary propulsion system. In some embodiments, the secondary propulsion system may replace the primary propulsion system. For example, the secondary propulsion system may be engaged to replace the primary propulsion when the primary propulsion system has no more remaining fuel.

At 714 the VTOL aircraft may be established in a vertical flight configuration. In some embodiments, the vertical flight configuration may be established by substantially halting horizontal movement and establishing the VTOL aircraft in a hover. In some embodiments, the vertical flight configuration may be established with some horizontal movement, such as on a glideslope.

At 716 the VTOL aircraft lands in a vertical flight configuration. It is noted, however, that the VTOL aircraft is not limited to a vertical landing. For example, the VTOL aircraft may land with forward motion, such as on a running landing.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A vertical takeoff and landing (VTOL) aircraft comprising:
   a first propulsion system configured to produce thrust, the first propulsion system comprising a first propulsion motor;
   a second propulsion system configured to produce lift and comprising:
      a second propulsion motor;
      at least one propeller coupled to the second propulsion motor, the at least one propeller comprising:
         a lift-producing blade located at a first end; and
         a counterweight located at a second end, wherein the counterweight is shaped as a second blade, the second blade having a wingspan that is smaller than the lift-producing blade, and having a uniform material density that is greater than the lift-producing blade;
   wherein the at least one propeller is configured to weathervane when the second propulsion motor is deactivated; and
   a control management system comprising one or more processors configured to:
      activate the second propulsion system;
      launch the VTOL aircraft in a vertical flight configuration;
      activate the first propulsion system;
      transition the VTOL aircraft to a horizontal flight configuration; and
      deactivate the second propulsion motor such that the at least one propeller weathervanes into an apparent wind, resulting in the lift-producing blade being oriented opposite a direction of travel in the horizontal flight configuration.

2. The VTOL aircraft as claim 1 recites, the control management system further configured to:
   re-activate the second propulsion system;
   reduce thrust generated by the first propulsion system to reduce a forward speed of the VTOL aircraft;
   increase lift generated by the second propulsion system;
   de-activate the first propulsion system;
   stabilize the aircraft in the vertical flight configuration, the second propulsion system providing sufficient lift to sustain vertical flight; and
   land the aircraft in the vertical flight configuration.

3. The VTOL aircraft as claim 1 recites, wherein the counterweight comprises:
 a first section oriented substantially along a plane defined by a chord of the lift producing blade; and
 a second section oriented substantially perpendicular to the first section, wherein the second section is located below the plane.

4. The VTOL aircraft as claim 1 recites, wherein the counterweight is configured to generate less lift than the lift-producing blade when the propeller is rotated by the second propulsion motor.

5. The VTOL aircraft as claim 1 recites, further comprising at least one wing configured to generate lift in response to thrust produced by the first propulsion system.

6. A vertical takeoff and landing (VTOL) aircraft comprising:
 a first propulsion system configured to generate thrust, the first propulsion system comprising a first motor;
 a second propulsion system configured to generate lift, the second propulsion system comprising:
  a second motor; and
  at least one propeller coupled to the second motor, the at least one propeller comprising:
   a lift-producing blade; and
   a counterweight opposite the lift-producing blade, the counterweight comprising aerodynamic features to reduce drag on the counterweight when the lift-producing blade is oriented opposite a direction of travel of the VTOL aircraft;
 wherein the lift-producing blade is configured to orient opposite the direction of travel when the second motor is de-activated.

7. The VTOL aircraft as claim 6 recites, wherein the second motor comprises an electric motor.

8. The VTOL aircraft as claim 6 recites, wherein the counterweight is configured to have a droop, and a center of mass of the counterweight is located below a plane defined by the lift producing blade.

9. The VTOL aircraft as claim 6 recites, further comprising at least one wing to generate lift in response to thrust generated by the first propulsion system.

10. The VTOL aircraft as claim 6 recites, wherein the second propulsion system further comprises:
 a third motor coupled to a second lifting propeller;
 a fourth motor coupled to a third lifting propeller; and
 a fifth motor coupled to a fourth lifting propeller.

11. The VTOL aircraft as claim 10 recites, wherein at least one of the second, third and fourth lifting propellers comprises a lift-producing blade and a counterweight opposite the lift-producing blade.

12. The VTOL aircraft as claim 6 recites, wherein the first propulsion system comprises a plurality of propellers driven by the first motor, each of the plurality of propellers comprising at least two blades.

13. The VTOL aircraft as claim 6 recites, wherein the counterweight is shaped as a second blade, the second blade:
 having a smaller wingspan than the lift-producing blade; and
 having a material density higher than the lift-producing blade.

14. The VTOL aircraft as claim 6 recites, wherein the aerodynamic features comprise an aerodynamic leading edge.

15. The VTOL aircraft as claim 6 recites, wherein the second propulsion system further comprises a locking mechanism configured to lock the at least one propeller in a fixed position.

16. The VTOL aircraft as claim 6 recites, further comprising a control management system configured to:
 receive signals from one or more accelerometers;
 access a flight plan from a memory;
 calculate adjustments necessary to maintain the flight plan; and
 send signals to the first and the second propulsion systems to make the adjustments.

17. The VTOL aircraft as claim 6 recites, wherein the first propulsion system is further configured to produce lift.

18. A method to operate an aircraft, the method comprising:
 activating at least one lifting motor to drive at least one propeller, the at least one propeller comprising:
  a lift-producing blade located at a first end; and
  counterweight located at a second end, wherein the counterweight is shaped as a second blade, the second blade having a wingspan that is smaller than the lift-producing blade, and having a uniform material density that is greater than the lift-producing blade;
 operating the VTOL aircraft in a vertical flight configuration while a thrusting motor is de-activated;
 activating the thrusting motor;
 transitioning the aircraft to a horizontal flight configuration; and
 de-activating the at least one lifting motor.

19. The method as claim 18 recites, further comprising:
 re-activating the at least one lifting motor;
 transitioning the aircraft to a vertical flight configuration; and
 de-activating the thrusting motor.

20. The method as claim 18 recites, wherein a center of mass of the counterweight is located below a plane defined by the lift producing blade.

* * * * *